United States Patent
Hoffmann et al.

(10) Patent No.: US 6,233,885 B1
(45) Date of Patent: *May 22, 2001

(54) ROLLER SEALING APPARATUS FOR FORMING A WEATHER SEAL BETWEEN A VEHICLE AND A LOADING DOCK OR THE LIKE

(75) Inventors: David J. Hoffmann, Peosta; Charles J. Ashelin, Dubuque, both of IA (US); Paul D. Rowlett, Mequon, WI (US)

(73) Assignee: Rite-Hite Holding Corporation, Milwaukee, WI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/028,725

(22) Filed: Feb. 24, 1998

(51) Int. Cl.[7] .................................................. E04B 2/90
(52) U.S. Cl. ...................... 52/173.2; 52/173.1; 52/2.13; 52/2.12
(58) Field of Search ................................ 52/173.1, 173.2, 52/2.13, 2.12

(56) References Cited

U.S. PATENT DOCUMENTS

| | | | |
|---|---|---|---|
| 3,352,314 | * | 11/1967 | Frommelt et al. ................. 52/173.2 |
| 3,538,655 | * | 11/1970 | Frommelt et al. ................. 52/173.2 |
| 3,665,997 | * | 5/1972 | Smith et al. ...................... 52/173.2 |
| 3,875,954 | * | 4/1975 | Frommelt et al. ............. 52/173.2 X |
| 3,939,614 | * | 2/1976 | Frommelt et al. ............. 52/173.2 X |
| 3,994,103 | * | 11/1976 | Ouellet ........................ 52/173.2 X |
| 4,554,768 | * | 11/1985 | Srajer ................................ 52/173.2 |
| 4,571,903 | * | 2/1986 | Strassner .......................... 52/173.1 |
| 5,125,196 | * | 6/1992 | Moody .............................. 52/173.2 |
| 5,185,977 | * | 2/1993 | Brockman et al. ................ 52/173.2 |
| 5,675,945 | * | 10/1997 | Giuliani et al. ................... 52/173.2 |

FOREIGN PATENT DOCUMENTS 24 36 518    7/1975   (DE).

* cited by examiner

Primary Examiner—Carl D. Friedman
Assistant Examiner—Phi Dieu Tran A
(74) Attorney, Agent, or Firm—Marshall, O'Toole, Gerstein, Murray & Borun

(57) ABSTRACT

A sealing apparatus for forming a weather seal between a vehicle and a loading dock is provided. In some embodiments, the apparatus includes a roller seal rotatably mounted to a support for rotation about an axis. The roller seal is movable in at least a vertical direction from a first position in the path of a vehicle entering the parking area, to a second position wherein the roller seal is disposed adjacent the top of the vehicle. Preferably, a curtain is suspended distally of the roller seal such that, when the roller seal is in the second position, the curtain forms a first seal with the top of the vehicle and the roller seal forms a second seal with the top of the vehicle. The curtain is semi-rigid and, in some instances, defines a ramping surface to facilitate movement of the roller seal over the leading edge of a vehicle approaching the loading dock.

36 Claims, 13 Drawing Sheets

US 6,233,885 B1

ROLLER SEALING APPARATUS FOR FORMING A WEATHER SEAL BETWEEN A VEHICLE AND A LOADING DOCK OR THE LIKE

FIELD OF THE INVENTION

The present invention relates generally to loading docks and, more particularly, to roller sealing apparatus for creating a weather seal between a vehicle and a loading dock or the like.

BACKGROUND OF THE INVENTION

The need to shelter loading docks and the personnel working thereon from weather related elements has long been known. For example, it has long been known that it is undesirable to permit snow, rain or wind to enter either a warehouse or a truck being unloaded at a dock. Permitting heated or cooled air to escape the warehouse during use of the dock is equally undesirable.

Many proposals have addressed these issues. For example, dock shelters and dock seals which provide employee comfort and protect inventory by keeping weather elements away from the dock area and which improve energy conservation by limiting loss of heated or cooled air have long been commercially available. While many of the above-noted products have been very successful in addressing these environmental issues, there remains room for improvement. For example, when a vehicle such as a semi-trailer truck has been in a rain or snow storm, it often collects water (and sometimes slush, snow or ice) on the top surface of its trailer. When the trailer backs up to a loading dock, there is a potential for this collection of water (or slush, snow or ice) to flow over the leading edge of the top of the trailer into the loading dock area. A similar effect can occur with a truck parked at a dock when a rain or snow storm begins. Although many available shelters and seals will prevent rain and snow from falling directly into the dock area, there is a potential for water, snow, ice or slush to collect on the trailer top and subsequently run over the leading edge of the trailer onto the dock. This potential is particularly acute in loading docks with parking areas pitched towards the dock, as all or nearly all of the rain or melting snow on the top surface of the trailer will run towards the lowest part of the trailer, which, in this example, is the leading edge of the truck adjacent the dock.

SUMMARY OF THE INVENTION

In accordance with an aspect of the invention, an apparatus is provided for use with a structure located adjacent a parking area for vehicles having a top surface. The apparatus comprises a support; and a roller seal rotatably mounted to the support for rotation about an axis. The roller seal is movable in at least a vertical direction from a first position in the path of a vehicle entering the parking area to a second position wherein the roller seal is disposed adjacent the top of the vehicle. The roller seal at least partially rotates about the axis as it moves from the first position to the second position.

In some embodiments, the roller seal travels a substantially arcuate path as it moves from the first position to the second position.

In some embodiments, the support comprises a pair of pivotable arms. In such embodiments, a first end of the roller seal is preferably rotatably coupled to a first one of the arms, and a second end of the roller seal is preferably rotatably coupled to a second one of the arms. In such embodiments, the arms are preferably pivotably mounted to a hood extending from the structure. Preferably, the apparatus is also provided with a locator for limiting distal motion of the roller seal.

In some embodiments, the apparatus is further provided with a curtain suspended distally of the roller seal. In such embodiments, the curtain preferably includes a stiffener to increase its rigidity.

In embodiments employing a curtain, the lower edge of the curtain is preferably suspended at least as low as the axis of the roller seal when the roller seal is in the first position such that, if a leading edge of the top of the vehicle is higher than the axis of the roller seal when the roller seal is in the first position, the vehicle contacts the curtain before contacting the roller seal.

In the foregoing embodiments, the curtain preferably provides a ramping surface to facilitate rolling of the roller seal over the leading edge of the vehicle; and/or the curtain provides a first seal with the top of the vehicle and the roller seal provides a second seal with the top of the vehicle.

Preferably, the top of the roller seal rolls away from the structure as the roller seal moves from the first position to the second position.

In some embodiments, the support comprises a pair of chains. In such embodiments, a first end of the roller seal is preferably rotatably coupled to a first one of the chains, and a second end of the roller seal is rotatably coupled to a second one of the chains. In such embodiments, the chains are preferably pivotably mounted to a hood extending from the structure. Preferably, a locator is provided for limiting distal motion of the roller seal.

In accordance with another aspect of the invention, an apparatus is provided for use with a structure located adjacent a parking area for vehicles having a top surface. The apparatus includes a support; a first sealing member; and a second sealing member. The first sealing member is mounted to the support for movement between a first position, wherein the first sealing member is disposed in the path of a vehicle entering the parking area, and a second position wherein the first sealing member forms a first seal with the top of the vehicle. The second sealing member is mounted distally of the first sealing member and forms a second seal with the top of the vehicle. The second seal is located distally of the first seal.

Preferably, the first sealing member comprises a roller seal rotatably mounted to the support for rotation about an axis. Preferably, the roller seal moves in at least a vertical direction between the first and the second positions; and/or the roller seal at least partially rotates about the axis as it moves from the first position to the second position.

Preferably, the second sealing member comprises a curtain. Preferably, a lower edge of the curtain is suspended at least as low as a center of the first sealing member when the first sealing member is in the first position such that, if a leading edge of the top of the vehicle is higher than the center of the first sealing member when the first sealing member is in the first position, the vehicle contacts the curtain before contacting the first sealing member.

In accordance with still another aspect of the invention, an apparatus is provided for use with a structure located adjacent a parking area for vehicles having a top surface. The apparatus includes a first sealing member and a second sealing member. The first sealing member is adapted for movement in at least a vertical direction for locating and forming a seal with the top of a vehicle entering the parking area. The second sealing member cooperates with the first sealing member to assist the first sealing member in moving to the top of the vehicle to form a seal therewith.

Other features and advantages are inherent in the apparatus claimed and disclosed or will become apparent to those skilled in the art from the following detailed description and its accompanying drawings.

DESCRIPTION OF THE PREFERRED EMBODIMENTS

Figure 1:
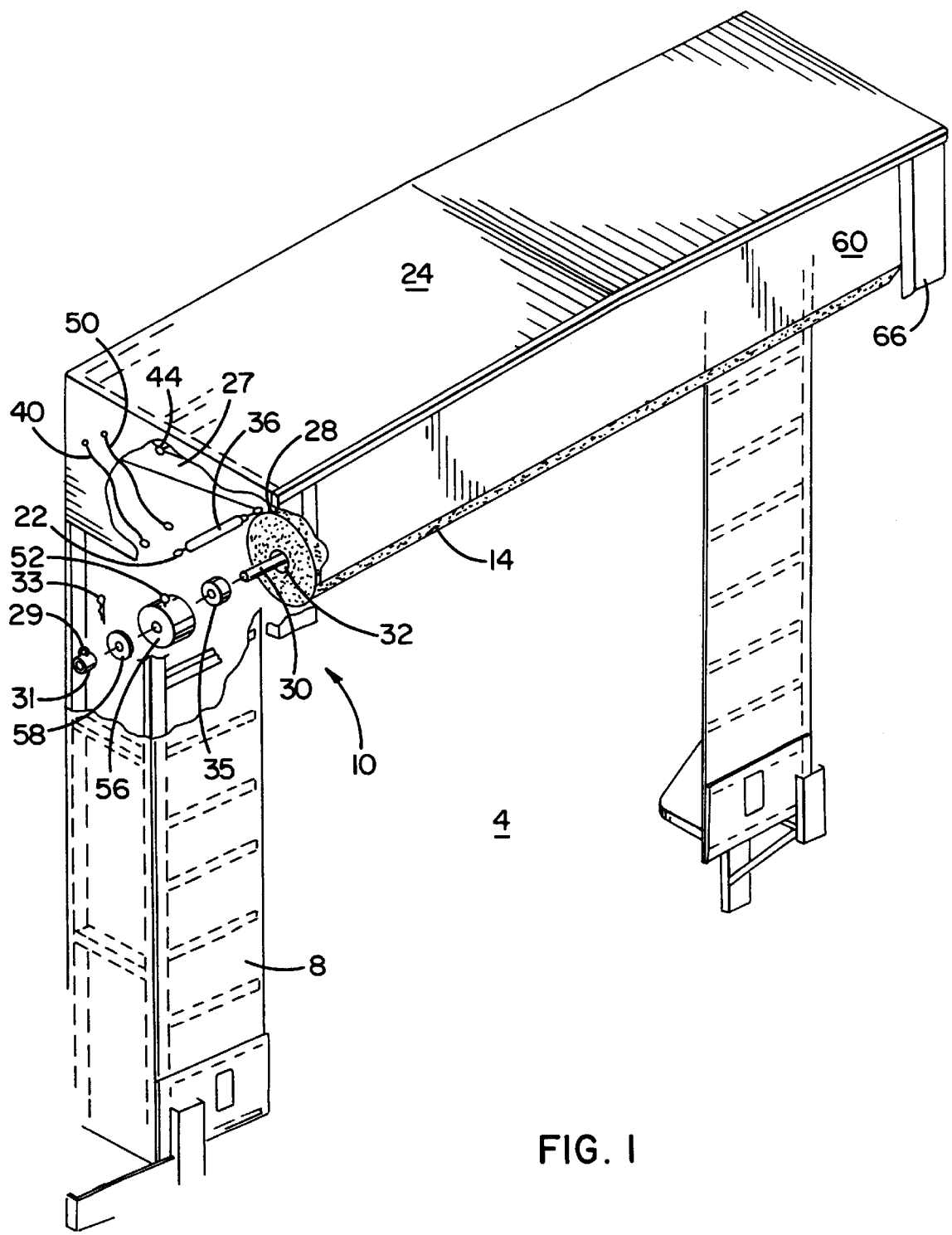
FIG. 1 is a partially exploded, perspective view of a dock shelter fitted with a sealing apparatus constructed in accordance with the teachings of the instant invention.

A sealing apparatus 10 constructed in accordance with the teachings of the invention is shown generally in FIG. 1. Although the sealing apparatus 10 is particularly well suited for use with a loading dock 4 on a warehouse or the like, persons of ordinary skill in the art will readily appreciate that the teachings of the instant invention are not limited to any particular environment of use. On the contrary, the teachings of the invention can be employed with virtually any structure adjacent a parking area where the creation of a seal with a top surface of a vehicle V is desired. Thus, although the sealing apparatus 10 illustrated in FIG. 1 is shown mounted on a dock shelter 8 such as the WG-402 sold by the Frommelt Products Corporation, persons of ordinary skill in the art will readily appreciate that the apparatus 10 could likewise be mounted to a dock seal such as the Eliminator™ sold by the Frommelt Products Corporation; directly to a warehouse wall; or to any other structure adjacent a parking area without departing from the scope or spirit of the invention.

Figure 3:
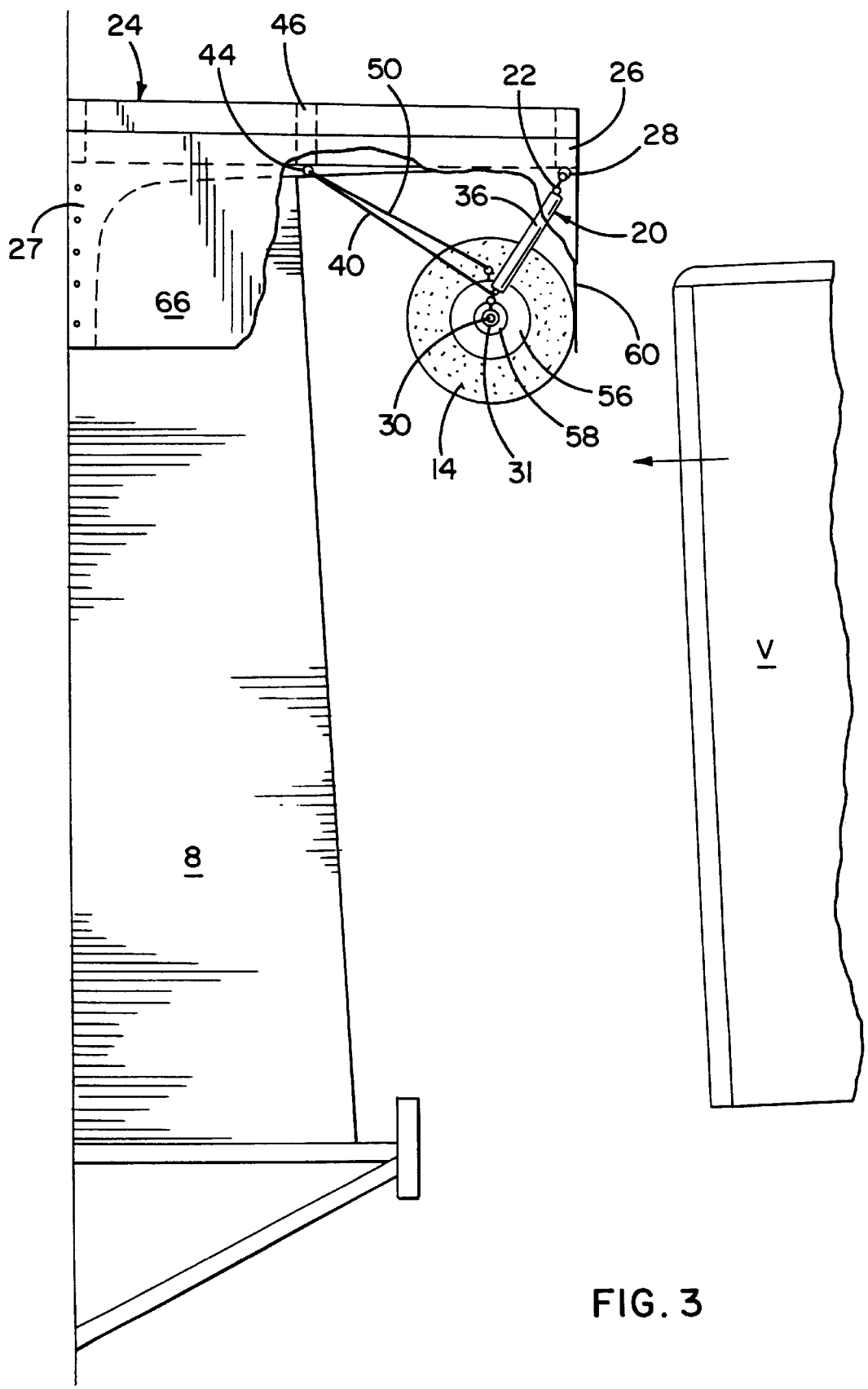
FIG. 3 is a side view of the sealing apparatus of FIG. 1 showing the apparatus in a rest position.

For the purpose of forming a substantially weatherproof seal with the top of a vehicle V, the sealing apparatus 10 is provided with a roller seal 14. As will be apparent to those of ordinary skill in the art, the roller seal 14 can be constructed of any compressible material. However, in the preferred embodiment, the seal 14 is constructed of a high resilience, cylindrical foam pad such as low density open cell polyurethane foam encased in a wear-resistant covering such as 22-ounce vinyl or hypalon coated flexible cloth. As most easily seen in FIGS. 3–6, the seal 14 is preferably positioned in the path of a vehicle V entering the parking area for deflection in at least a vertical direction from a first position (such as that shown in FIG. 3) to a second position (such as that shown in FIG. 5) wherein the seal 14 is disposed adjacent the top surface of a vehicle V located in the parking area, illustratively by compressing against the top surface. It will be understood that the illustrated first and second positions are representative, and that other locations and/or positions for the roller seal 14 can be used as the first and second positions without departing from the scope of the invention. By way of example, not limitation, a vehicle having a height different from that shown in FIG. 5 will cause the seal 14 to deflect to a correspondingly different second position, as will a vehicle moved further (or closer) from the dock shelter 8.

In order to ensure an effective seal is created, the roller seal 14 preferably has a length of approximately nine and one-half feet to thereby cover a standard truck width of eight and one-half feet plus one additional foot for off center approaches. Although the roller seal 14 illustrated in FIGS. 1–6 has a circular cross-section with an approximately 15 inch diameter, persons of ordinary skill in the art will readily appreciate that seals having other sizes and shapes could likewise be employed without departing from the scope of the invention.

To suspend the roller seal 14 in the path of a vehicle V entering the parking area, the sealing apparatus 10 is provided with a support 20. In the preferred embodiment illustrated in FIGS. 1–6, the support 20 is implemented as a pair of chains 22 suspended from the support frame of a hood 24. In the illustrated embodiment, the chains 22 are mounted to a beam 26 supported at either end by brackets 27 associated with the hood 24. The beam 26 can be implemented as a wood 2×6 board or the like. Preferably, the chains 22 are pivotably connected to the beam 26 via hooks or eye-rings 28.

Figure 2:
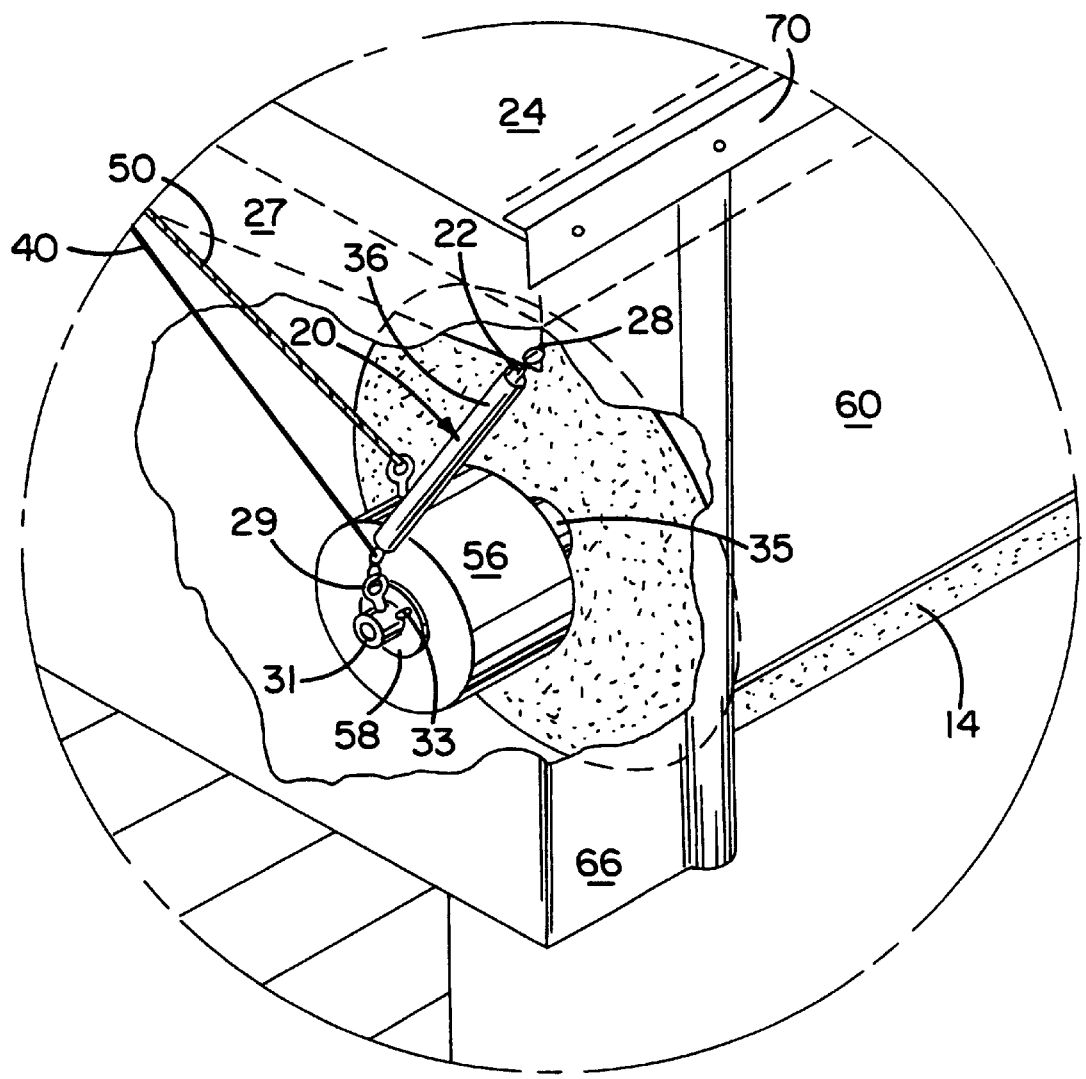
FIG. 2 is an enlarged, partial view of the sealing apparatus of FIG. 1.

To rotatably couple the roller seal 14 to the chains 22, the ends of the chains 22 opposite the hooks 28 are coupled to eye-rings 29 which are removably mounted on a shaft 30 (FIG. 2). The shaft 30 is preferably longer than the roller seal 14 such that the shaft 30 extends across the width of the dock opening and out of the opposite ends of the seal 14. The eye-rings 29 are preferably selectively coupled to the portions of the shaft 30 extending outside of the ends of the roller seal 14. In particular, the eye-rings 29 are preferably mounted on tubular members 31 which can be selectively secured on the opposite ends of the shaft 30 with cotter pins 33 as shown in FIG. 2.

In order to mount the roller seal 14 for free rotation about the shaft 30, the roller seal 14 is provided with a central tube 32 which is, in turn, concentrically mounted on the shaft 30 as shown in FIG. 1. To facilitate free rotation and to secure the roller seal 14 against movements along its axis of rotation, the tube 32 is rotatably mounted to the shaft 30 via bearings 35 at either end of the seal 14 (see FIG. 2). Although other devices can be employed in these roles, in the preferred embodiment, the shaft 30 is implemented by a 1 inch diameter steel rod; the tube 32 is implemented by a 2 inch diameter steel tube; and the bearings 35 are implemented by sealed ball bearings which are commercially available from Schatz as Part No. TW-25.

To prevent the links of the chains 22 from becoming entangled, the chains 22 are each preferably mounted within a cover 36. Although in the illustrated embodiment, the covers 36 are implemented as steel tubing, persons of ordinary skill in the art will appreciate that the covers 36 could also be implemented by other rigid tubular members without departing from the scope or spirit of the invention. Similarly, although the embodiment shown in FIGS. 1–6 has been described as employing chains as its support 20, persons of ordinary skill in the art will appreciate that flexible cables or rigid arms could be substituted for the chains without departing from the scope of the invention. When such cables are used, the covers 36 can be optionally eliminated because the risk of link entanglement associated with chains will also have been removed.

To limit distal movement of the chains 22 and to thereby define the at-rest position of the roller seal 14 (i.e., the first position), the apparatus 10 is further provided with positive mechanical locators, preferably implemented as motion limiting flexible cables 40. Preferably, the apparatus 10 includes two motion limiting cables 40, one attached at each end of the roller seal 14. As shown in FIGS. 3–6, the first ends of the flexible cables 40 are preferably coupled to the hood 24 via hooks or eye-rings 44 mounted on a second beam 46. As with the beam 26, the beam 46 is preferably implemented by a 2×6 wood board extending across the span of the dock opening and supported at either end by brackets 27. The second end of each cable 40 is connected to a link in a respective one of the chains 22, or, alternatively, to an eye-ring 29 on a respective one of the tubular members 31. Preferably, the locators 40 are coupled, either directly or indirectly, to the shaft 30.

Although in the preferred embodiment, the positive mechanical locators are implemented as cables 40, persons of ordinary skill in the art will readily appreciate that other locators can be implemented in this role without departing from the scope of the inventions. By way of example, not limitation, the locators may optionally be implemented as rigid stops. Such stops may be mounted directly or indirectly on the shaft 30 for contacting a fixed structure such as the hood 24. Alternatively, they may be mounted to a fixed structure such as the hood 24 for contacting the roller seal 14 in the at-rest position.

For the purpose of ensuring an effective seal is formed when the roller seal 14 is in the second position, the apparatus 10 is provided with weights 56. As mentioned above, the ends of shaft 30 extend from the opposite ends of the roller seal 14. The weights 56, which are preferably circular in cross-section, have a central bore sized to receive the shaft 30 such that the weights 56 can be mounted directly on the shaft 30 at opposite ends of the roller seal 14. Preferably, the weights 56 are substantially identical in construction and mass to ensure a uniform seal 14 is provided across the width of the vehicle top. In the preferred embodiment, the weights 56 are implemented by 6-inch diameter round stock. Alternatively, the weights may be mounted within the roller seal 14.

As shown in FIG. 1, each weight 56 is preferably mounted on the shaft 30 between a bearing 33 and a washer 58. The weights 56 are secured on the ends of the shaft 30 by the tubular members 31 which are fixed in position with cotter pins 33.

In addition to the motion limiting cables 40, the apparatus 10 preferably includes a pair of safety cables 50. As with the motion limiting cables 40, one of the safety cables 50 is mounted at each end of the roller seal 14. In particular, each cable 50 is preferably connected between one of the eye-rings 44 and a ring 52 either directly or indirectly coupled to the shaft 30, illustratively by being welded or otherwise secured to a respective one of the weights 56. The safety cables 50 ensure that, should one of the connections between the chains 22 and the seal 14, or the chains 22 and the hood 24 fail, or should one or both of the chains 22 break, the roller seal 14 will not fall to the ground, but will instead be safely suspended from the hood 24 until repairs can be effected.

In operation, when a vehicle V having a height less than the height of the rotational axis of the roller seal 14 enters the parking area, it contacts the roller seal 14. The roller seal 14 responds by rotating about its axis. As the vehicle V continues into the parking area, the roller seal 14 is deflected in a rearward direction and the chains 22 likewise pivot rearwardly. As the vehicle V forces the roller seal 14 rearward, the roller seal 14 rolls up the contacting surface of the vehicle V, up over the leading edge, and onto the top of the vehicle V where it forms a seal. The seal 14 rolls along the vehicle top until the vehicle V comes to a rest. Thus, when a vehicle V moves into the parking area, the roller seal 14 moves in at least a vertical direction to locate and form a seal with the vehicle top. When the vehicle V leaves the parking area, the roller seal 14 rolls proximally along the vehicle top until it falls over the edge of the vehicle V and returns to the at-rest position defined by the motion limiting cables 40.

In order to facilitate smooth movement of the roller seal 14 over the leading edge of vehicles having a leading edge which is at least as high as the rotational axis of the roller seal 14, the apparatus 10 is provided with a curtain 60. Preferably, the curtain 60 is suspended from the-hood 24 distally of the roller seal 14 such that its lower edge is suspended at least as low as the rotational axis of the roller seal 14 when the roller seal 14 is in the first position. Thus, if the leading edge of a vehicle V entering the parking area is higher than the rotational axis of the roller seal 14, the vehicle V will contact the curtain before the vehicle V contacts the roller seal 14. In particular, as shown in FIG. 4, when such a vehicle V enters the parking area, it deflects the curtain 60 rearwardly into contact with the roller seal 14.

Preferably, the curtain 60 is implemented by a semi-rigid material such as the two-ply, 100 lb. monofilament belting material manufactured by All-State Belting Company. As a result, when the curtain 60 deflects proximally, it defines a ramping surface to facilitate smooth movement of the roller seal 14 over the leading edge of the vehicle V (see FIG. 4).

Figure 4:
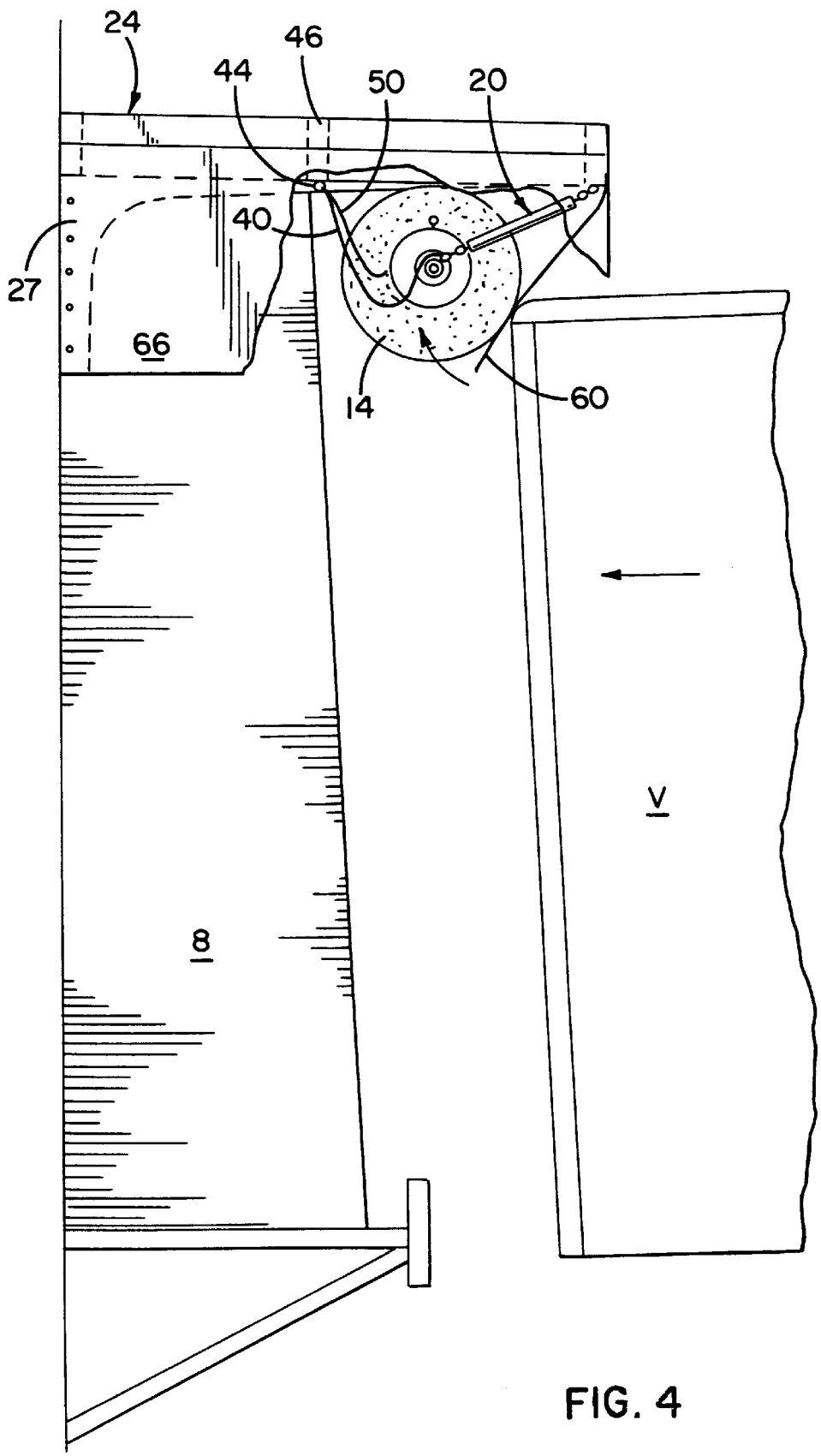
FIG. 4 is a view similar to FIG. 3 but showing the apparatus in contact with a vehicle entering the parking area.

Were the curtain 60 excluded from the apparatus 10, when a vehicle V having a leading edge higher than the rotational axis of the roller seal 14 entered the parking area, the roller seal 14 would have a tendency to rotate in a counterclockwise direction when viewed from the end shown in FIG. 4. As a result, the roller seal 14 would have a tendency to pop or jump over the leading edge and onto the top of the vehicle V potentially causing undue stress and wear on the roller seal 14.

Figure 5:
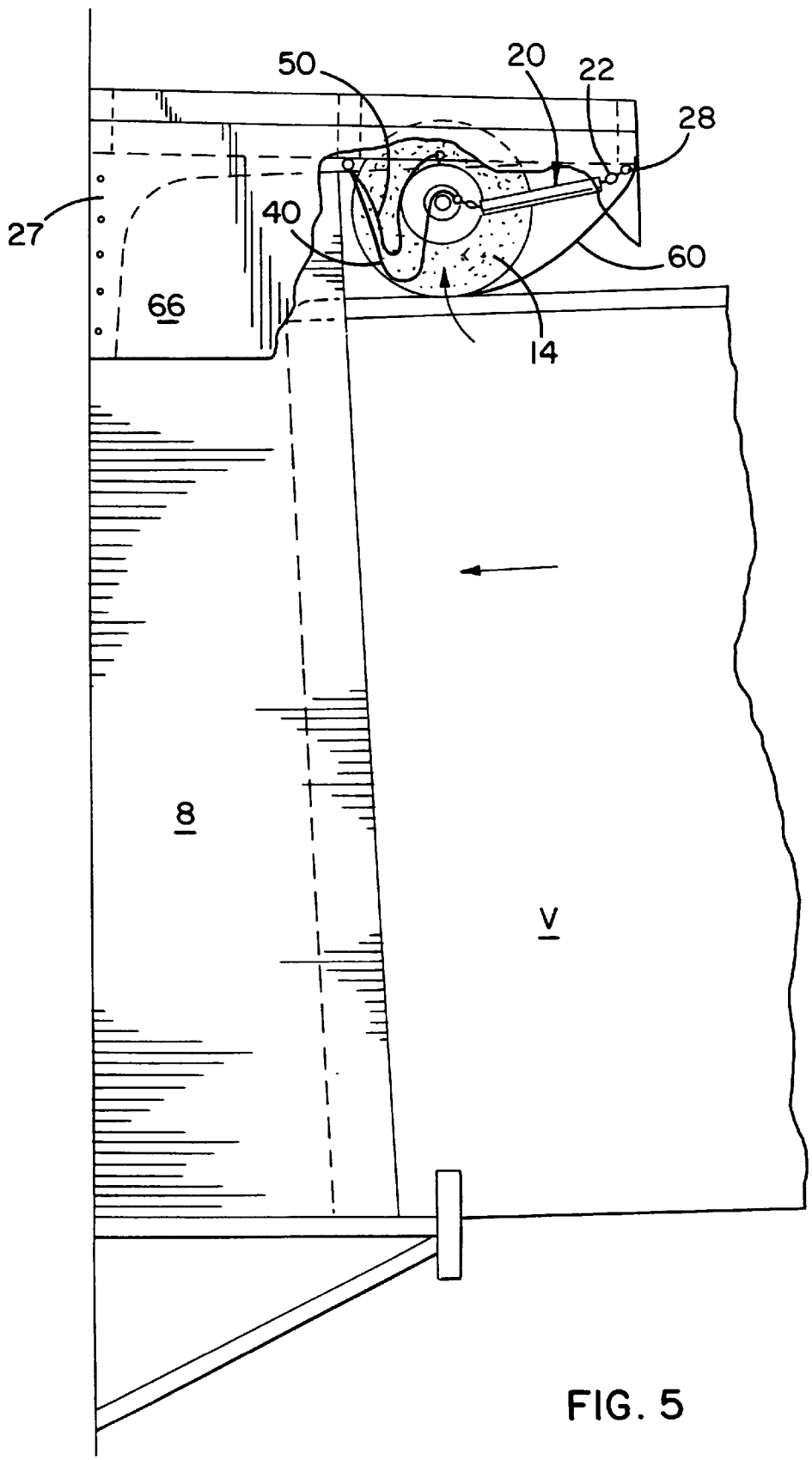
FIG. 5 is a view similar to FIGS. 3 and 4 but showing the apparatus in the sealed position.

Employing the curtain 60 avoids such undesirable effects. In particular, as shown in FIG. 4, the curtain 60 provides a ramping surface that permits the roller seal 14 to smoothly roll onto the top of the vehicle V. As a result, as the roller seal 14 rolls up to and over the leading edge, the curtain 60 and the roller seal 14 substantially prevent water, snow, or ice from getting behind the roller seal 14 or from falling over the leading edge of the vehicle V into the dock area. Preferably, the curtain 60 and the roller seal 14 interact such that the top of the roller seal 14 only moves in a direction away from the structure (e.g., only rotates clockwise in FIGS. 3–6) as the roller seal 14 moves from the first to the second positions. As shown in FIG. 5, the curtain 60 provides a first seal and the roller seal 14 provides a second seal with the top of the vehicle V. Thus, in the embodiment shown in FIGS. 1–6, the apparatus 10 provides a double seal with the vehicle top. It should be noted that, in the preferred embodiment, this double seal is only effected for vehicles having a height of approximately thirteen feet or above. For shorter vehicles, only one seal is effected, namely, by the roller seal 14. While the curtain 60 may optionally be lengthened to provide a double seal for such vehicles, in such an instance, the hood 24 should be extended and the curtain 60 mounted further away from the roller seal 14 to prevent the curtain 60 from rolling under the roller seal 14 to thereby avoid compromising the seal created by the roller seal 14.

Figure 6:
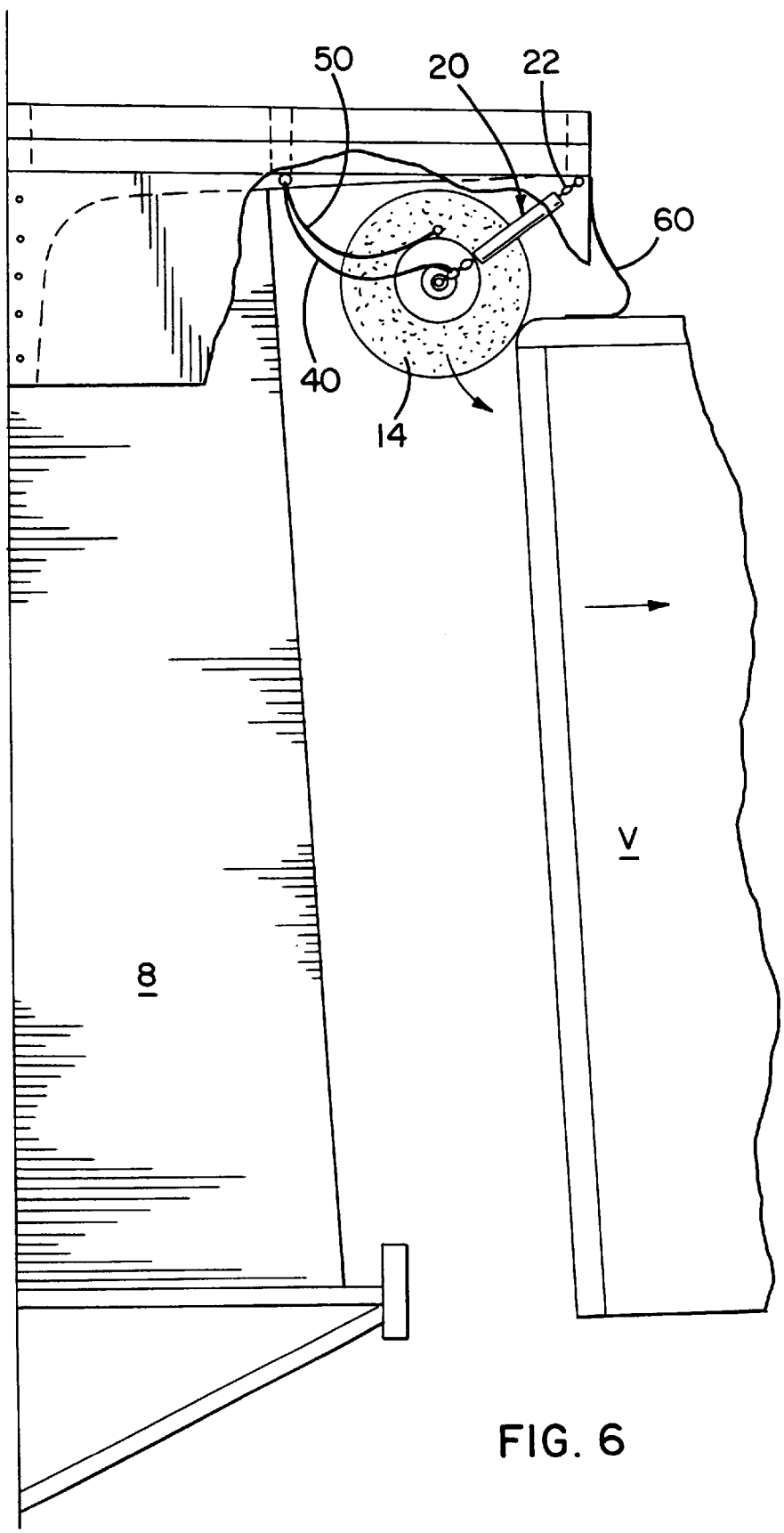
FIG. 6 is a view similar to FIGS. 3–5 but showing the reaction of the apparatus as the vehicle exits the parking area.

As shown in FIG. 6, when the vehicle V leaves the parking area, the curtain 60 preferably remains in contact with the vehicle top until after the roller seal 14 has rolled over the edge of the top. In other words, the seal formed by the curtain 60 preferably remains intact until the vehicle V has moved a predetermined distance such as 4 feet out of the dock area to help prevent weather elements on the top of the vehicle from entering the dock area when the vehicle V exits. In addition to helping maintain the distal seal as the vehicle V exits, the semi-rigid nature of the curtain 60 permits the curtain 60 to deform as shown in FIG. 6 to prevent damage to the apparatus 10 and binding when a vehicle V leaves the parking area.

Although as explained above, the curtain 60 is preferably implemented by 100 lb. monofilament block belting, persons of ordinary skill in the art will readily appreciate that other materials can be used in this role without departing from the scope of the invention. By way of example, not limitation, a vinyl-based fabric with one or more stiffeners such as rigid plastic plates secured in areas where increased rigidity is desired could be employed in this role.

Figure 7:
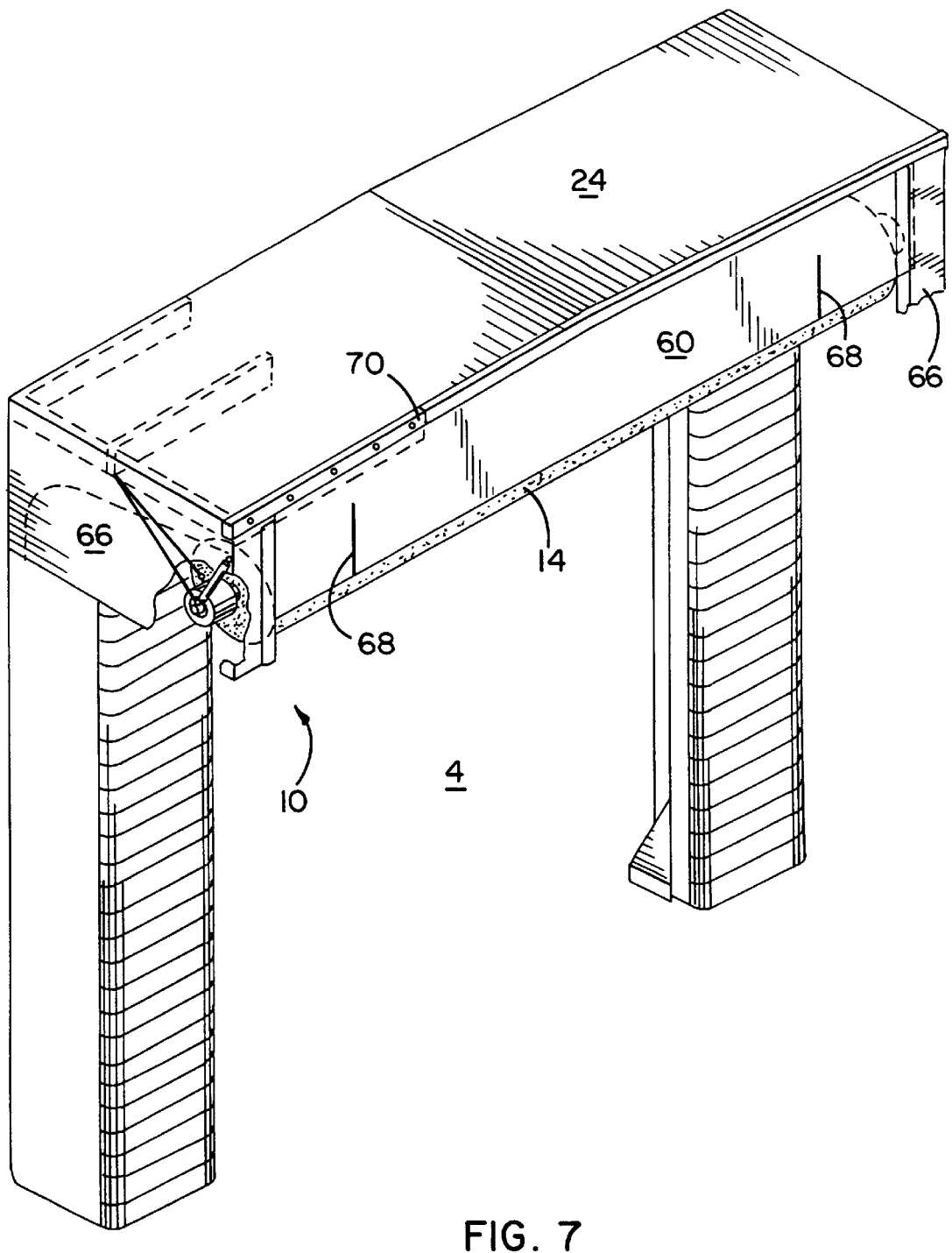
FIG. 7 is a perspective view of a dock seal fitted with the sealing apparatus of FIG. 1.

FIG. 7 illustrates the apparatus 10 in another environment of use. In particular, it shows the apparatus 10 fitted to a dock seal. As shown in FIG. 7, the hood 24 is formed by a fabric (such as vinyl or hypalon coated flexible cloth), or metal sheeting (such as coated steel) secured to the support frame by bolts or other conventional fasteners. The hood 24 is preferably provided with a gutter (not shown) along its distal end to collect rain water and the like running down the hood 24 and to direct that water away from the dock opening. In addition, storage curtains 66 are preferably mounted on the sides of the hood 24 to further protect the dock area against weather elements. Such storage curtains 66 are also preferably employed in the embodiment shown in FIGS. 1–6.

As shown in FIG. 7, the curtain 60 may optionally be provided with two vertical slits 68. The slits 68 are preferably located near opposite ends of the curtain 60. The slits 68 increase the flexibility of the curtain 60 to facilitate separation of the curtain 60 from the vehicle roof and from any gutter associated with the leading edge of the vehicle V. As shown in FIGS. 2 and 7, the curtain 60 is preferably mounted to the hood 24 via conventional fasteners such as bolts tightened through a metal trim plate 70. The trim plate 70 provides a washer surface to prevent the fasteners from pulling through the curtain when tightened or during the stress of operation.

Figure 8:
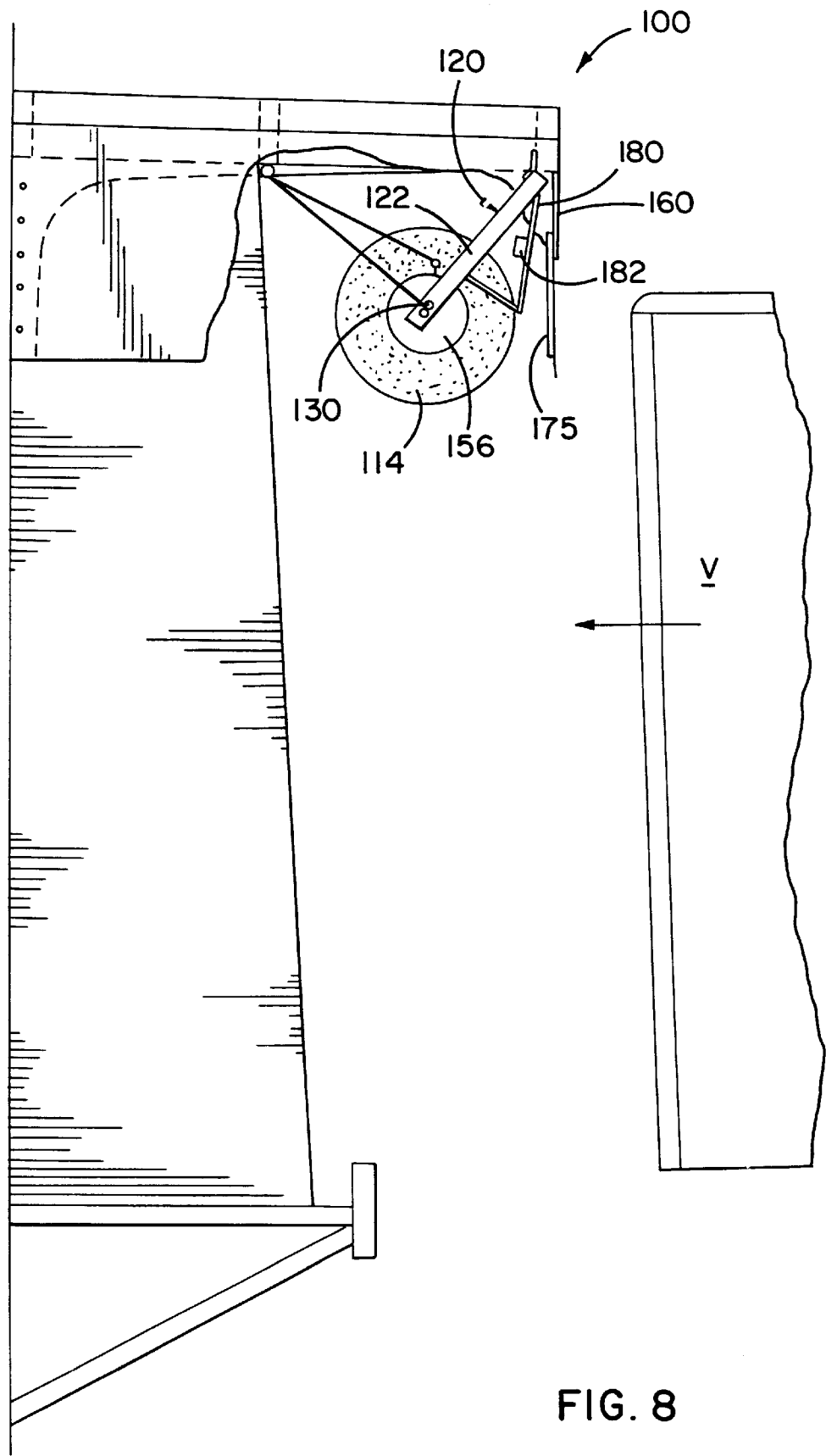
FIG. 8 is a side view of another sealing apparatus constructed in accordance with the teachings of the invention.
Figure 9:
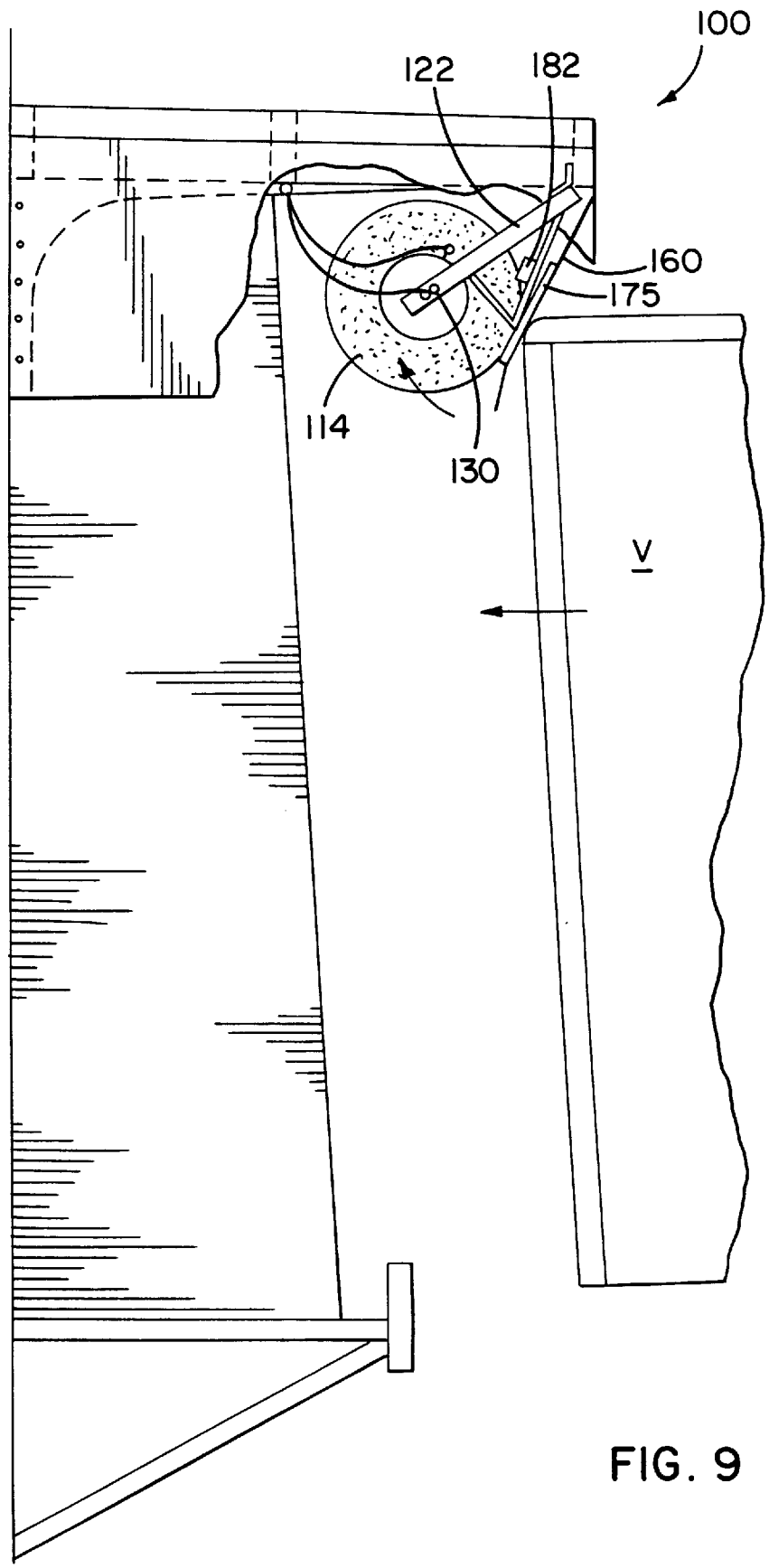
FIG. 9 is a view similar to FIG. 8 but showing the apparatus interacting with a vehicle entering the parking area.
Figure 10:
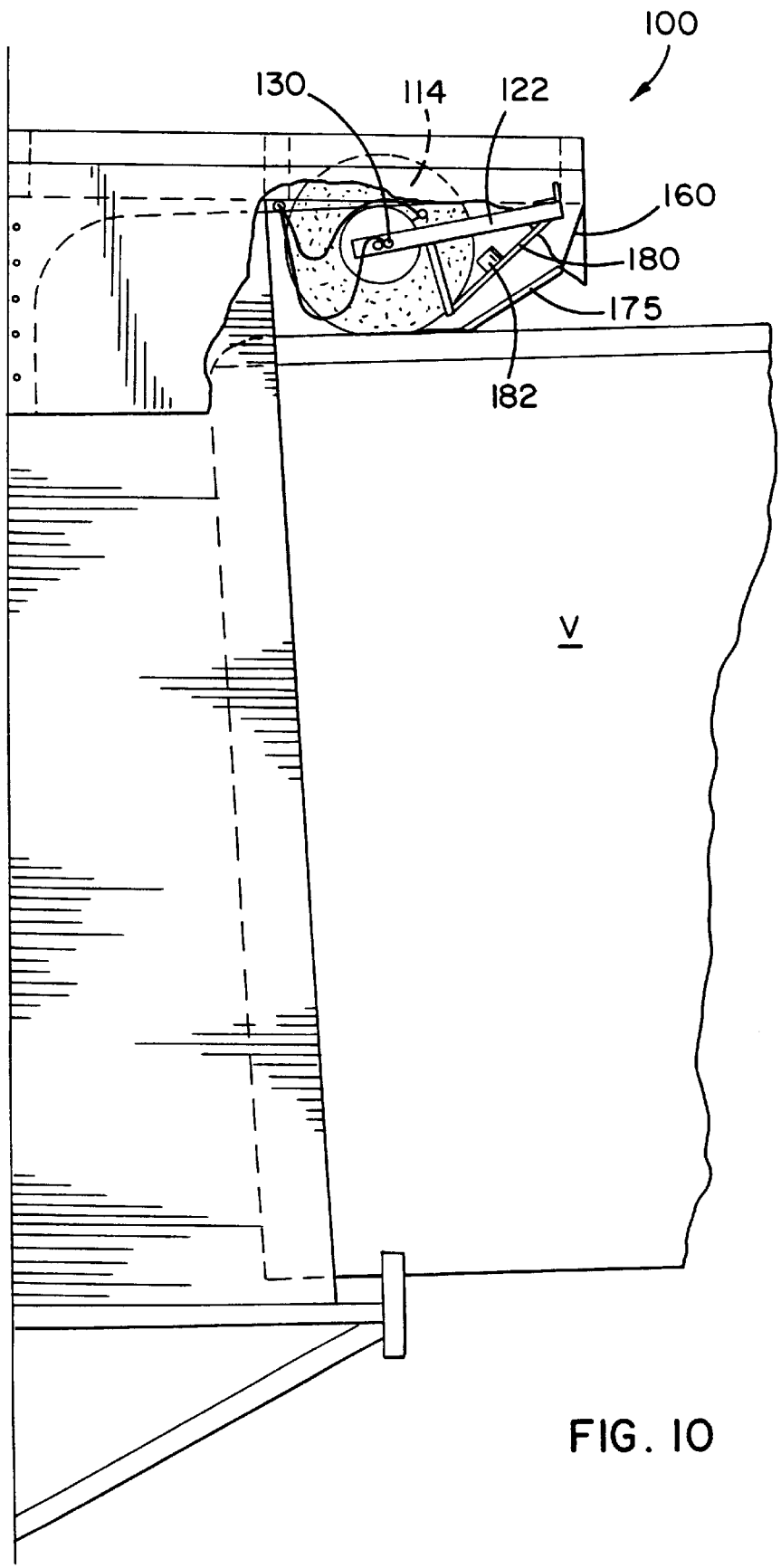
FIG. 10 is a view similar to FIG. 8 but showing the apparatus in the sealed position.

An alternative sealing apparatus 100 constructed in accordance with the teachings of the invention is illustrated in FIGS. 8–10. As with the sealing apparatus 10, the sealing apparatus 100 can be mounted on a dock shelter 8, a dock seal, a wall, or on any other structure where a seal is desired without departing from the scope of the invention.

Figure 12:
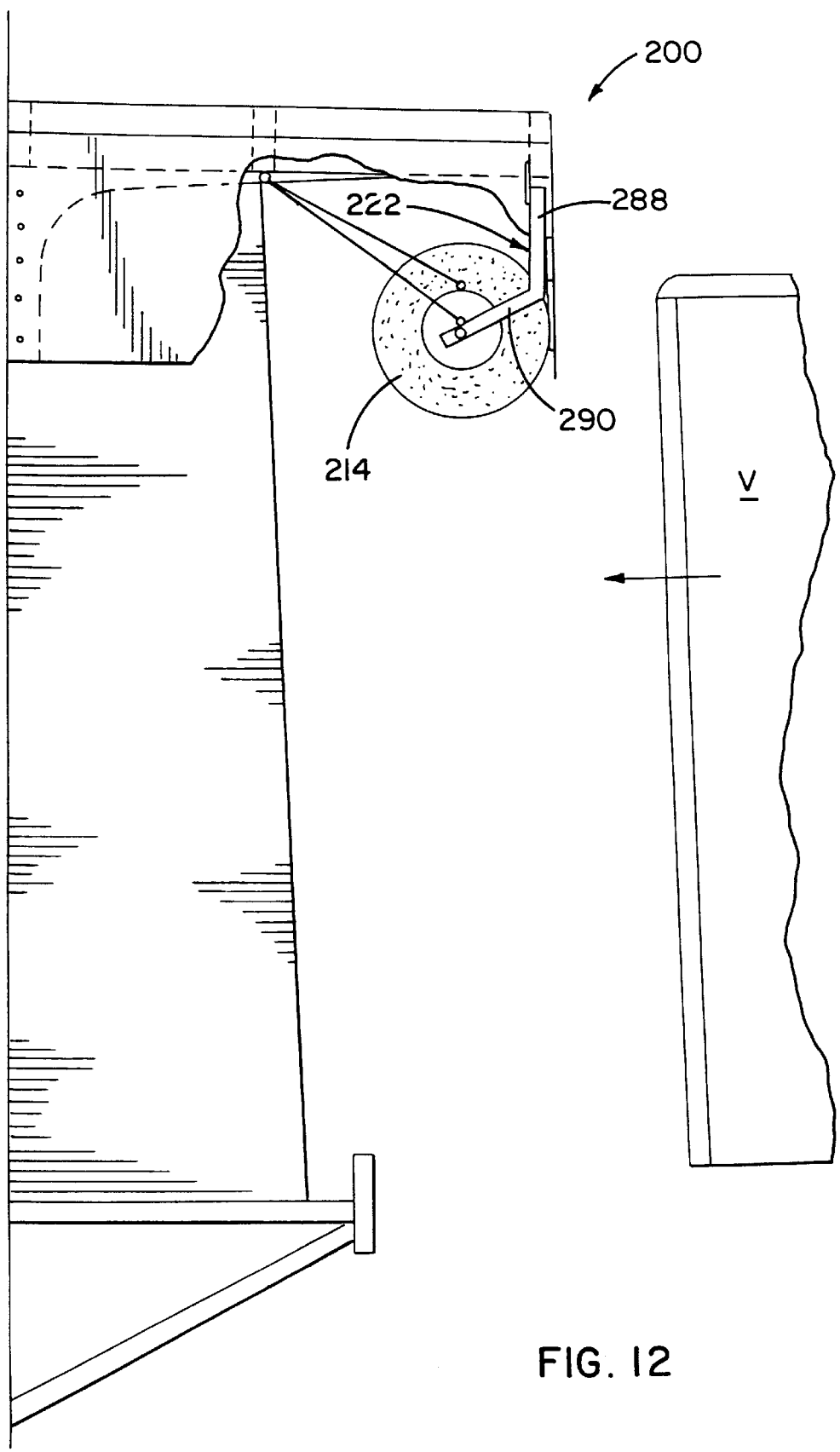
FIG. 12 is a side view of still another sealing apparatus constructed in accordance with the teachings of the invention.
Figure 13:
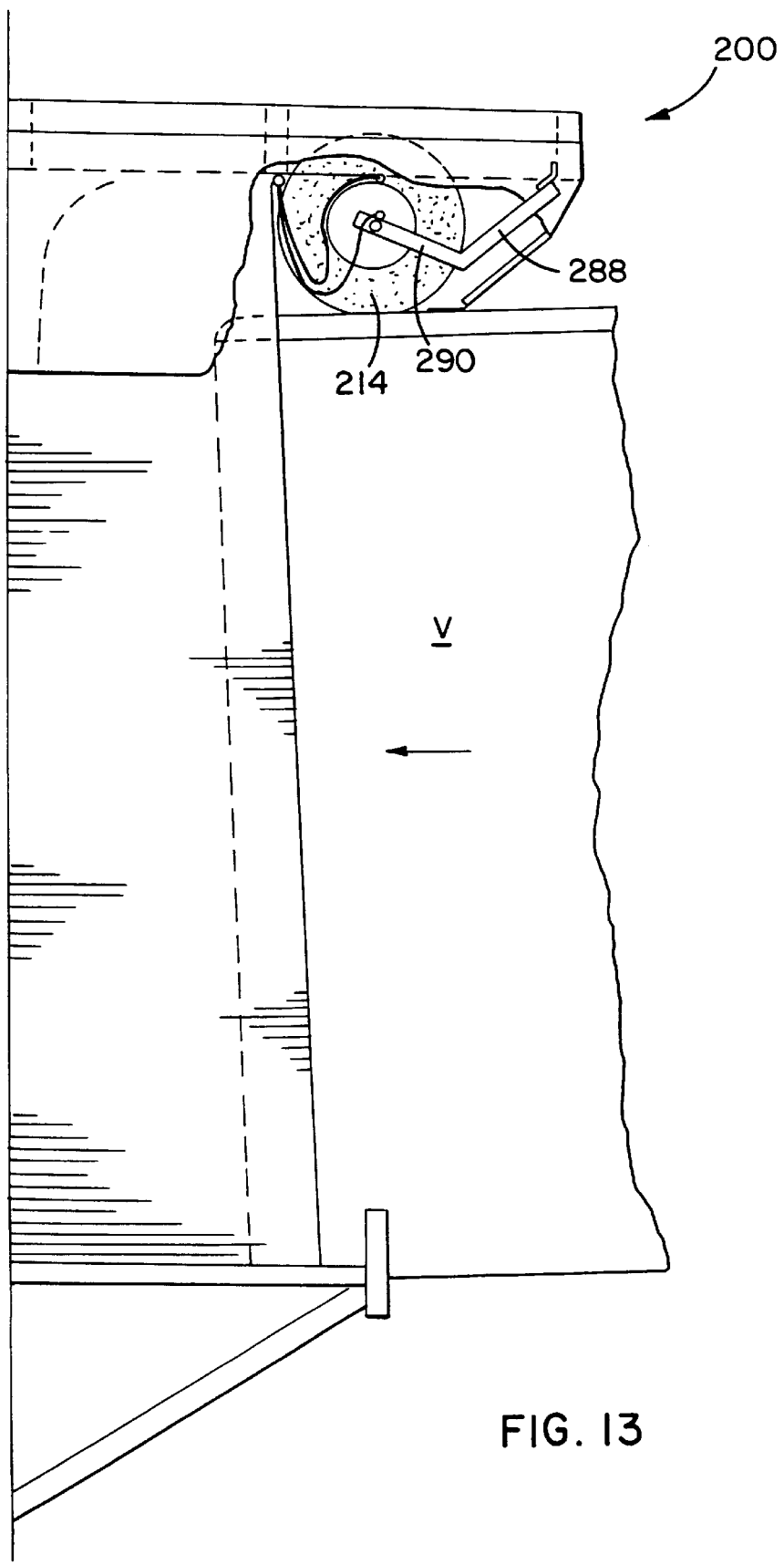
FIG. 13 is a view similar to FIG. 12 but showing the apparatus in the sealed position.

The apparatus 100 shown in FIGS. 8–10 and the apparatus 200 illustrated in FIGS. 12–13, share many components with the apparatus 10 discussed above. In the interest of brevity, a description of like components will not be repeated in the following. Instead, the interested reader is referred to the above description for a detailed explanation of the shared components.

Turning to FIG. 8, the apparatus 100, like the apparatus 10, includes a support 120, a roller seal 114 and a curtain 160. However, in the apparatus 100, the support 120 is implemented by two rigid, tubular arms 122 disposed at opposite ends of the roller seal 114. The tubular arms 122 are pivotably mounted to the hood 124 via a conventional bolt or the like. The opposite ends of the arm 122 define bores sized to receive the ends of shaft 130. As with the apparatus 10 described above, weights 156 can be mounted on the shaft 130 to increase the mass of seal 114. Also like the apparatus 10, tubular members with cotter pins (not shown in FIGS. 8–10) are preferably used to secure the arms 122 to the shaft 130.

Since the arms 122 are rigid and linear, when a vehicle V moves the roller seal 114 from its first position (FIG. 8) to its second position (FIG. 10), the roller seal 114 traverses a substantially arcuate path.

In the embodiment shown in FIGS. 8–10, the curtain 160 is implemented by a vinyl coated fabric. As a result, to increase the rigidity of the curtain 160, a stiffener 175 is riveted to the proximal surface of the curtain 160. The stiffener 175 is preferably implemented by a plastic plate.

In order to increase the range of vehicles with which the apparatus 100 may be utilized, the apparatus 100 is provided with ramps 180 mounted on the distal surfaces of its pivotable arms 122. The ramps provide contact surfaces for taller vehicles to ensure such vehicles will displace the roller seal 114 along its arcuate path without causing damage to the apparatus 100. Preferably, the ramps 180 are secured to one another by a transverse stiffening bar 182. The ramps 180 enable vehicles whose leading edge is above the roller seal 114 at the time of initial contact to safely use the sealing apparatus 100.

Figure 11:
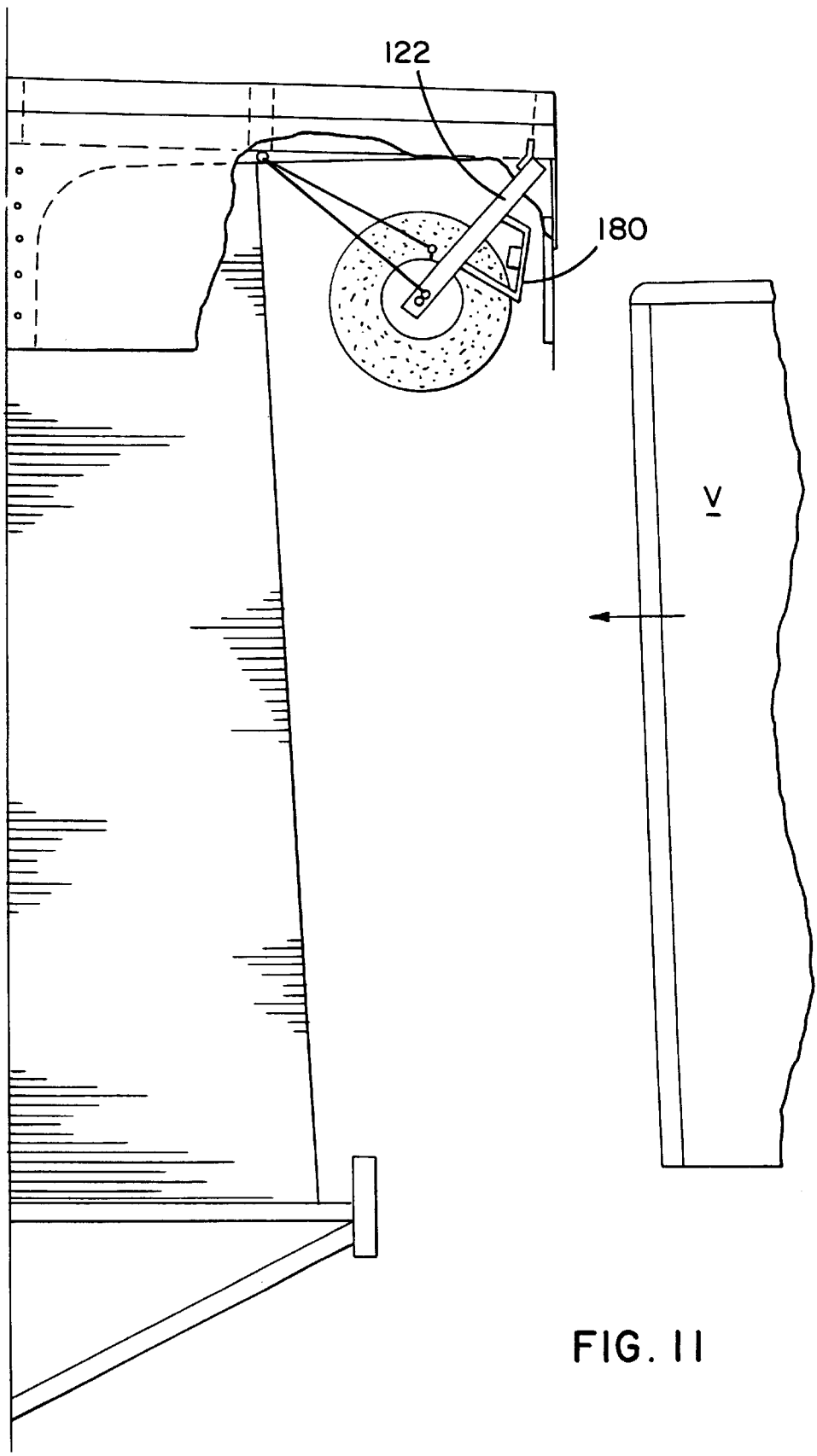
FIG. 11 is a side view of yet another sealing apparatus constructed in accordance with the teachings of the invention.

The ramps 180 can be implemented in many ways without departing from the scope of the invention. For example, the ramps 180 may combine with their respective arms 122 to define a triangular shape as shown in FIGS. 8–10. Alternatively, they may combine with their respective arms 122 to define a trapezoidal shape as shown in FIG. 11. Preferably, the ramps 180 are formed by welding a 4-inch wide bar (bent to the desired shape) to the arms 122.

Still another alternative way to extend the range of vehicles able to enjoy the benefits of the sealing apparatus is shown in FIGS. 12–13. In the embodiment illustrated in FIGS. 12–13, the ramps 180 are eliminated, and the linear, rigid arms 122 of the apparatus 100 are replaced with rigid arms 222. Each of the rigid arms 222 include two members 288, 290 coupled to define an obtuse angle. In this embodiment, the members 288 are substantially vertically disposed when the roller seal 214 is in its at-rest position. These vertical members 288 provide contact surfaces for taller vehicles interacting with the apparatus 200, while the angularly disposed members 290 shorten the distance the roller seal 214 must traverse to reach the top of the vehicle V.

Those skilled in the art will appreciate that, although the teachings of the invention have been illustrated in connection with certain embodiments, there is no intent to limit the invention to such embodiments. On the contrary, the intention of this application is to cover all modifications and embodiments fairly failing within the scope of the appended claims either literally or under the doctrine of equivalents.

What is claimed is:

1. For use with a structure located adjacent a parking area for vehicles having a top surface, an apparatus comprising:
   a support; and
   a roller seal having an axis, the roller seal being rotatably mounted to the support for rotation about the axis, the roller seal being adapted to interact with a vehicle entering the parking area by moving from a first position in the path of the vehicle entering the parking area to a second position wherein the roller seal is disposed adjacent the top of the vehicle, wherein the roller seal at least partially rotates about the axis as it moves from the first position to the second position and the axis of the roller seal moves in at least a vertical direction as the roller seal moves from the first to the second position, wherein the support comprises a pair of pivotable arms, a first end of the roller seal being rotatable coupled to a first one of the arms, and a second end of the roller seal being rotatably coupled to a second one of the arms.

2. An apparatus as defined in claim 1 wherein the roller seal travels a substantially arcuate path as it moves from the first position to the second position.

3. An apparatus as defined in claim 1 wherein the arms are pivotably mounted to a hood.

4. An apparatus as defined in claim 1 further comprising a locator for limiting distal motion of the roller seal.

5. An apparatus as defined in claim 1 further comprising a first ramp mounted on the first arm.

6. An apparatus as defined in claim 5 further comprising a curtain suspended distally of the roller seal.

7. An apparatus as defined in claim 6 wherein the curtain includes a stiffener to increase its rigidity.

8. An apparatus as defined in claim 7 wherein the stiffener comprises a plastic plate mounted to the proximal surface of the curtain.

9. An apparatus as defined in claim 6 wherein a lower edge of the curtain is suspended at least as low as the axis of the roller seal when the roller seal is in the first position such that a vehicle entering the parking area with a leading edge that is higher than the axis of the roller seal contacts the curtain before contacting the roller seal.

10. An apparatus as defined in claim 5 further comprising a second ramp mounted on the second arm.

11. An apparatus as defined in claim 10 further comprising a stiffening bar coupled between the first and second ramps.

12. An apparatus as defined in claim 1 wherein the arms are substantially linear.

13. An apparatus as defined in claim 1 wherein the arms comprise first and second members, the first and second members being coupled such that they define an obtuse angle.

14. An apparatus as defined in claim 1 further comprising a curtain suspended distally of the roller seal.

15. An apparatus as defined in claim 14 wherein a lower edge of the curtain is suspended at least as low as the axis of the roller seal when the roller seal is in the first position such that a vehicle entering the parking area with a leading edge which is higher than the axis of the roller seal contacts the curtain before contacting the roller seal.

16. An apparatus as defined in claim 15 wherein the top of the roller seal rolls away from the structure as the roller seal moves from the first position to the second position.

17. An apparatus as defined in claim 14 wherein the curtain is adapted to provide a first seal with the top of the vehicle and the roller seal is adapted to provide a second seal with the top of the vehicle, the first seal being located distally of the second seal.

18. An apparatus as defined in claim 1 wherein the roller seal is compressible.

19. An apparatus as defined in claim 18 wherein the roller seal comprises a cylindrical foam pad.

20. An apparatus as defined in claim 1 further comprising a weight coupled to the roller seal to facilitate compression of the roller seal against the top of the vehicle when the roller seal is in the second position.

21. For use with a structure located adjacent a parking area for vehicles having a top surface, an apparatus comprising:
   a support;
   a roller seal having an axis, the roller seal being rotatable mounted to the support for rotation about the axis, the roller seal being adapted to interact with a vehicle entering the parking area by moving from a first position in the path of the vehicle entering the parking area to a second position wherein the roller seal is disposed adjacent the top of the vehicle, wherein the roller seal at least partially rotates about the axis as it moves from the first position to the second position and the axis of the roller seal moves in at least a vertical direction as the roller seal moves from the first to the second position; and
   a curtain suspended distally of the roller seal, wherein the curtain provides a ramping surface to facilitate rolling of the roller seal over the leading edge of the vehicle.

22. For use with a structure located adjacent a parking area for vehicles having a top surface, an apparatus comprising:
   a support; and
   a roller seal having an axis, the roller seal being rotatably mounted to the support for rotation about the axis, the roller seal being adapted to interact with a vehicle entering the parking area by moving from a first position in the path of the vehicle entering the parking area to a second position wherein the roller seal is disposed adjacent the top of the vehicle, wherein the roller seal at least partially rotates about the axis as it moves from the first position to the second position and the axis of the roller seal moves in at least a vertical direction as the roller seal moves from the first to the second position, wherein the support comprises a pair of chains, a first end of the roller seal being rotatably coupled to a first one of the chains, and a second end of the roller seal being rotatably coupled to a second one of the chains.

23. An apparatus as defined in claim 22 wherein the chains are pivotably mounted to a hood.

24. An apparatus as defined in claim 22 further comprising a locator for limiting distal motion of the roller seal.

25. An apparatus as defined in claim 22 further comprising first and second covers, a first one of the chains being located within the first cover, and a second one of the chains being located within the second cover.

26. An apparatus as defined in claim 23 wherein the first and second covers comprise tubes.

27. For use with a structure located adjacent a parking area for vehicles having a top surface, an apparatus comprising:

a support;

a roller seal having an axis, the roller seal being rotatably mounted to the support for rotation about the axis, the roller seal being adapted to interact with a vehicle entering the parking area by moving from a first position in the path of the vehicle entering the parking area to a second position wherein the roller seal is disposed adjacent the top of the vehicle, wherein the roller seal at least partially rotates about the axis as it moves from the first position to the second position and the axis of the roller seal moves in at least a vertical direction as the roller seal moves from the first to the second position; and a weight coupled to the roller seal to facilitate compression of the roller seal against the top of the vehicle when the roller seal is in the second position, wherein the roller seal is mounted for rotation about a shaft, and the weight is mounted on a first end of the shaft extending from the roller seal.

28. An apparatus as defined in claim 27 wherein the shaft extends from both ends of the roller seal, and further comprising a second weight mounted to a second end of the shaft opposite the first end.

29. For use with a structure located adjacent a parking area for vehicles having a top surface, an apparatus comprising:

a support;

a roller seal having an axis, the roller seal being rotatably mounted to the support for rotation about the axis, the roller seal being adapted to interact with a vehicle entering the parking area by moving between a first position wherein the roller seal is disposed in the path of the vehicle entering the parking area to a second position wherein the roller seal forms a first seal with the top of the vehicle, wherein the roller seal moves upward when it moves from the first position to the second position; and a second sealing member mounted distally of the roller seal, the second sealing member being adapted to form a second seal with the top of the vehicle, the second seal being located distally of the roller seal, wherein the second sealing member comprises a curtain and wherein the curtain provides a ramping surface to facilitate movement of the roller seal over the leading edge of the vehicle.

30. An apparatus as defined in claim 29 wherein the roller seal moves in at least a vertical direction between the first and the second positions.

31. An apparatus as defined in claim 29 wherein the roller seal at least partially rotates about the axis as it moves from the first position to the second position.

32. An apparatus as defined in claim 29 wherein the roller seal comprises a cylindrical foam pad.

33. An apparatus as defined in claim 29 wherein a lower edge of the curtain is suspended at least as low as a center of the roller seal when the roller seal is in the first position such that a vehicle entering the parking area with a leading edge which is higher than the center of the roller seal contacts the curtain before contacting the roller seal.

34. An apparatus as defined in claim 29 wherein the curtain includes a stiffener to increase its rigidity.

35. An apparatus as defined in claim 34 wherein the stiffener comprises a plastic plate mounted to the proximal surface of the curtain.

36. For use with a structure located adjacent a parking area for vehicles having a top surface, an apparatus comprising:

a support;

a first sealing member mounted to the support, the first sealing member being adapted to interact with a vehicle entering the parking area by moving between a first position wherein the first sealing member is disposed in the path of the vehicle entering the parking area to a second position wherein the first sealing member forms a first seal with the top of the vehicle; and a curtain mounted distally of the first sealing member, the curtain being adapted to form a second seal with the top of the vehicle, the curtain being located distally of the first seal, wherein the curtain provides a ramping surface to facilitate movement of the first sealing member over the leading edge of the vehicle.

* * * * *